United States Patent
Alips et al.

(10) Patent No.: US 6,914,213 B2
(45) Date of Patent: Jul. 5, 2005

(54) METHOD AND DEVICE FOR OVERLAPPING WELDING OF TWO COATED METAL SHEETS WITH A BEAM OF HIGH ENERGY DENSITY

(75) Inventors: Philippe Alips, Armbouts Cappel (FR); François Dubrulle, Neuilly en Thelle (FR); Gabriel Vergniez, Boisdinghem (FR)

(73) Assignee: Usinor, Puteaux (FR)

( * ) Notice: Subject to any disclaimer, the term of this patent is extended or adjusted under 35 U.S.C. 154(b) by 0 days.

(21) Appl. No.: 10/491,909

(22) PCT Filed: Oct. 3, 2002

(86) PCT No.: PCT/FR02/03380

§ 371 (c)(1),
(2), (4) Date: Apr. 8, 2004

(87) PCT Pub. No.: WO03/031111

PCT Pub. Date: Apr. 17, 2003

(65) Prior Publication Data

US 2004/0200813 A1 Oct. 14, 2004

(30) Foreign Application Priority Data

Oct. 9, 2001 (FR) .......................... 01 12990

(51) Int. Cl.⁷ ..................... B23K 26/32; B23K 15/00
(52) U.S. Cl. ................... 219/121.64; 219/121.63
(58) Field of Search .............. 219/121.63, 121.64, 219/121.13, 121.14

(56) References Cited

U.S. PATENT DOCUMENTS

| | | | |
|---|---|---|---|
| 5,603,853 A | * | 2/1997 | Mombo-Caristan .... 219/121.64 |
| 6,087,619 A | | 7/2000 | Berkmanns et al. |
| 6,608,278 B1 | * | 8/2003 | Xie et al. .............. 219/121.64 |

FOREIGN PATENT DOCUMENTS

| | | | |
|---|---|---|---|
| EP | 706 072 | | 4/1996 |
| EP | 865 863 | | 9/1998 |
| FR | 2 755 048 | | 4/1998 |
| JP | 4-231190 A | * | 8/1992 |
| JP | 8-90265 A | * | 4/1996 |
| JP | 2002-178178 A | * | 6/2002 |
| WO | WO-00/66314 A1 | * | 11/2000 |
| WO | WO 01 177722 | | 3/2001 |

\* cited by examiner

*Primary Examiner*—Geoffrey S. Evans
(74) *Attorney, Agent, or Firm*—Sughrue Mion, PLLC

(57) ABSTRACT

The invention concerns a method for overlapping welding of two coated metal sheets (1, 2) with a beam of high energy density (11), characterized in that it consists in splitting the beam (11) into a first sub-beam (12) passing through both coated metal sheets (1, 2) and forming in said zone a first molten metal bath (18) and into a non-through second sub-beam (13) forming a second molten metal bath (19) whereof the depth is less than the thickness of the upper coated metal sheet (1) and overlapping at least part of the first molten metal bath (18) for promoting evacuation of vapour from the coating material and directing on the second molten metal bath (19) a neutral gas jet with high ejection speed to form at the surface of the second molten metal bath a sink (22).

15 Claims, 3 Drawing Sheets

METHOD AND DEVICE FOR OVERLAPPING WELDING OF TWO COATED METAL SHEETS WITH A BEAM OF HIGH ENERGY DENSITY

The invention relates to a lap welding process and device for welding, by means of a high-energy-density beam, two metal sheets coated with a material-having an evaporation temperature below the melting point of the constituent material of said metal sheets.

In various industries, especially those for manufacturing automobile body components or parts for domestic electrical appliances, coated sheets are used that comprise a central metal part with a thickness of between 0.5 and 3 mm for example and coated on each of its faces with a layer of a protective material such as, for example, relatively complex zinc or aluminum alloys with a thickness of less than 25 $\mu$m.

In general, the invention applies to sheets coated with any material whose evaporation temperature is below the melting point of the base material of which the sheets are made.

To weld two bare sheets, that is to say those not having any coating, it is known to partly overlap the two sheets and to move a high-energy-density beam along this overlap region so as to form a hermetically sealed continuous weld bead or seam.

In the case of welding two coated sheets, for example two galvanized or electrogalvanized steel sheets, this welding process using a high-energy-density beam has a major drawback.

This is because the metal may, at discrete points in the high-energy-density beam impact spot, reach a temperature of several thousand degrees C, which is therefore very much higher than the vaporization point of the constituent material of the coating.

Thus, the coating material lying between the two sheets in the overlap region is rapidly brought to the vapor state and violently degases via the only possible path, that is to say through the pool of molten metal or weld pool created in said sheets by the high-energy-density beam.

Now, a layer of coating material with a thickness of 10 $\mu$m occupies a volume of a few cubic centimeters once it has vaporized, and the pressure within the interface in the overlap region of the coated sheets may reach a few hundred bars.

Given that the evaporation point of the coating material is below the melting point of the base material of which the two sheets are made, vapor of this coating material trapped between these two sheets penetrates the wall of the weld pool so that there are numerous expulsions and a large part of the weld pool is expelled in the form of violent splashes.

This lack of liquid metal therefore results in the formation of porosities within the joint zone.

Moreover, gas bubbles may also be trapped as the metal solidifies, which results in the formation of volume defects.

As a result, the weld seam exhibits porosity, which poses problems as regards sealing in the overlap region of the coated sheets, or as regards the mechanical strength of the bonds.

Several solutions have been proposed for eliminating the drawbacks due to uncontrolled evolution of the vapor of the coating material resulting in a weld seam of poor quality.

One of the known solution consists in creating, before welding, a gap between the two sheets to be welded in order to promote removal of the coating material vapor.

However, this known solution requires an additional operation to create the gap, by suitable devices, and there is no guarantee that this gap is reproducible. In addition, the gap thus created is detrimental to the fatigue strength of the joints.

One known solution consists in combining a high-energy-density beam and a heat source.

The heat source, which is used before the high-energy-density beam, makes modifications that ensure welding conditions with conventional parameters. Thus, it is known to combine a high-energy-density beam with a MIG torch. However, these hybrid techniques have the drawback of significantly increasing the cost and reducing the flexibility of the process.

Another known solution also consists in creating microchannels at the interface between the two sheets in one of the coatings so as to facilitate removal of the coating vaporized during welding. These microchannels may be formed by corrugations in the sheet or else by prior micromachining carried out by means of a laser beam.

However, the formation of corrugations on one of the sheets by prestamping does not allow a continuous bond to be obtained, and therefore does not guarantee hermetic sealing of the weld seam, and premachining using a laser beam is expensive and difficult to carry out.

It is an object of the invention to avoid the abovementioned drawbacks by proposing a lap welding process and device for welding two coated sheets with a high-energy-density beam that prevent any expulsion of coating material vapor and the formation of porosity within the weld, while still allowing a gap tolerance before welding in line with the joint, and without any excessive constraint in positioning these coated sheets.

The subject of the invention is therefore a lap welding process for welding, by means of a high-energy-density beam, two metal sheets coated with a material that has an evaporation temperature below the melting point of the material of the sheets, characterized in that:

the two coated sheets are at least partly overlapped;

the faces of the two sheets in the overlap region are brought into contact with each other;

the high-energy-density beam is split, on the one hand, into a first sub-beam fully penetrating both coated sheets in the overlap region and forming a first weld pool in this region and, on the other hand, into a partially penetrating second sub-beam forming a second weld pool, the depth of which is less than the thickness of the upper coated sheet, the second weld pool at least partly overlapping the first weld pool in order to promote removal of the coating material vapor;

an inert gas jet is directed with a high ejection velocity onto the second weld pool in order to form a depression in the surface of the second weld pool, increasing the rate of removal of the coating material vapor; and a hermetically sealed continuous weld bead or seam is formed along the overlap region by displacement of both sub-beams and the inert gas jet, or of both coated sheets.

According to other features of the invention:

the focal point of the first sub-beam is located at a distance of more or less 2 mm from the upper face of the upper coated sheet;

the focal point of the first sub-beam is located in the upper coated sheet at a depth lying between the upper face of this coated sheet and approximately one third of said sheet;

the focal point of the second sub-beam is located above or below the upper face of the upper sheet;

the surface area of the second weld pool is larger than the surface area of the first weld pool;

the surface area of the depression is smaller than the surface area of the second weld pool; and the power density of each sub-beam is modulated according to the thickness of the two coated sheets in the overlap region and to the thickness of the upper coated sheet.

The subject of the invention is also a lap welding device for welding, by means of a high-energy-density beam, two sheets coated with a material having an evaporation temperature below the melting point of the material of the sheets, characterized in that it comprises:

means for splitting the high-energy-density beam, on the one hand, into a first sub-beam fully penetrating both coated sheets in the overlap region and forming a first weld pool in this region and, on the other hand, into a partially penetrating second sub-beam forming a second weld pool, the depth of which is less than the thickness of the upper coated sheet, the second weld pool at least partially overlapping the first weld pool in order to promote removal of the coating material vapor;

a nozzle for blowing an inert gas jet with a high ejection velocity onto the second weld pool in order to form a depression in the surface of said second weld pool, increasing the rate of removal of the coating material vapor; and means for the continuous displacement of both sub-beams and the nozzle, or of both coated sheets.

According to other features of the invention:

the means for splitting the high-energy-density beam comprise a focusing mirror having two dioptric elements of different focal lengths, one of said dioptric elements being able to be moved in order to adjust the position of the optical axes of the two sub-beams relative to each other;

the distance separating the two optical axes of the two sub-beams is between 3 and 5 mm;

the point of contact of the axis of the inert gas jet on the upper face of the upper coated sheet corresponds approximately to the point of impact of the optical axis of the second sub-beam on said upper face;

the high-energy-density beam is a laser beam;

the distance separating the free end of the nozzle from the point of contact of the inert gas jet on the upper face of the upper coated sheet is between 30 and 50 mm;

the inert gas flow rate is between 12 and 35 l/min; and the nozzle makes -an angle of between 30 and 60° with the upper face of the upper coated sheet.

Other features and advantages of the invention will become apparent over the course of the description that follows, this being given by way of example and with reference to the appended drawings in which.

Figure 1:
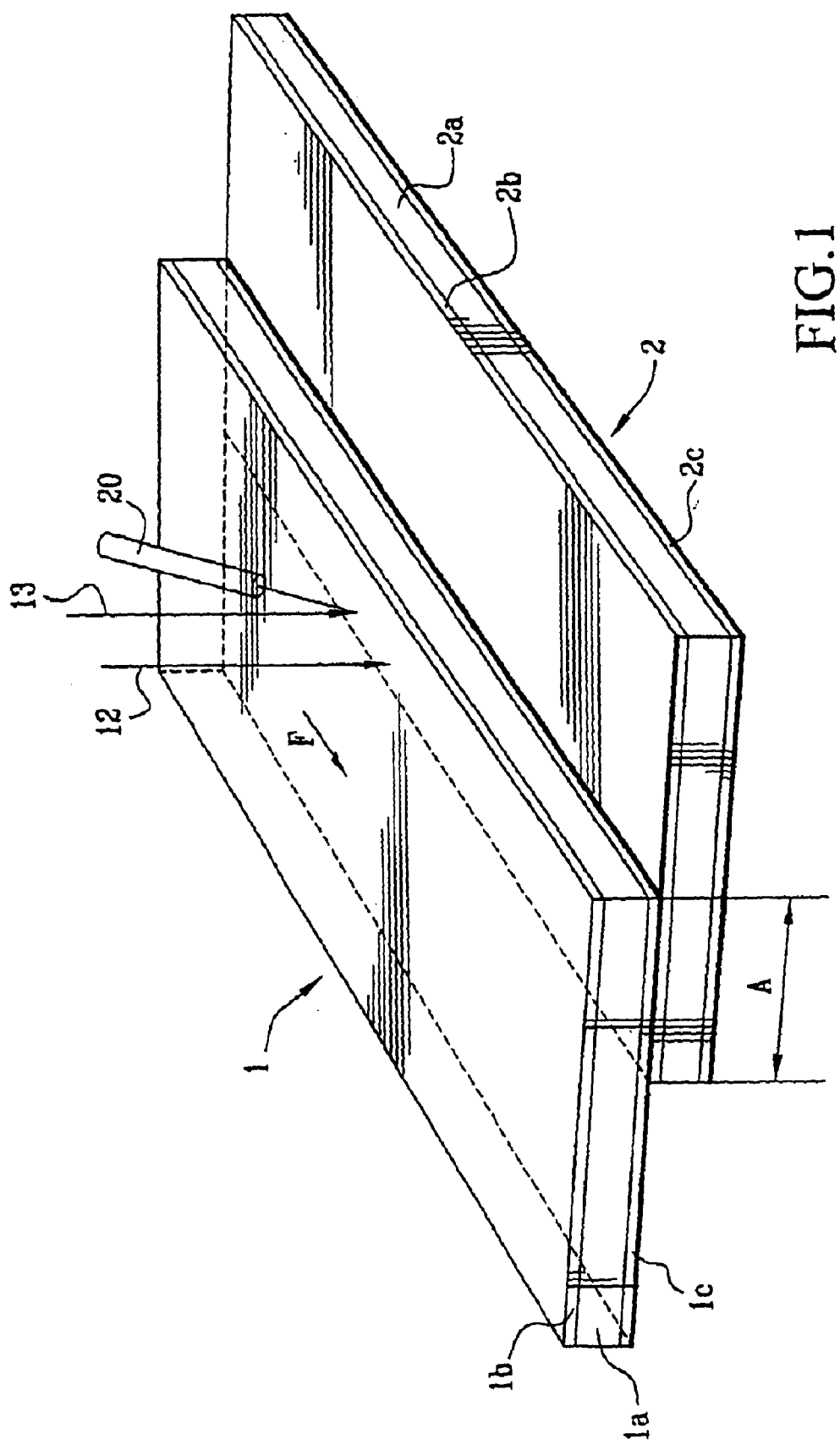
FIG. 1 is a schematic view in perspective of two coated metal sheets to be welded together by a welding device according to the invention.

The welding device shown schematically in FIGS. 1 and 2, denoted in its entirety by the reference 10, is intended for the partial or total lap welding of two metal sheets 1 and 2 that are coated with a material having an evaporation temperature below the melting point of the material of the sheets Conventionally, the sheet 1 has a central metal part 1a and, on each of its main faces, a layer 1b and 1c of, for example, a zinc or aluminum coating.

Likewise, the sheet 2 has a central metal part 2a provided on each of its main faces with a layer 2b and 2c of a coating of, for example, relatively complex zinc or aluminum alloys.

According to a variant, the sheets 1 and 2 may have a coating layer on only one face.

As an example, each coated sheet 1 and 2 has a total thickness of between 0.5 and 3 mm and each coating layer 1b, 1c and 2b, 2c has a thickness of less than 25 µm.

In the figures, the thickness of the sheets 1 and 2 has been intentionally exaggerated so as to make the description easier to understand.

To produce an assembly intended, for example, to form automobile body components or else parts for a domestic electrical appliance, the sheets 1 and 2 are partly superposed, as shown in FIG. 1, with an overlap region A so as to bring at least part of the coating 1c of the sheet 1 into contact with part of the coating 2b of the sheet 2, and to do so over the entire length of said sheets 1 and 2. The gap j between the sheets may be between 0 and 0.3 mm.

With a conventional welding process, this coating material initially present at the interface between the sheets 1 and 2 is brought rapidly to the vapor state during welding of the sheets 1 and 2 by a high-energy-density beam and the vapor is violently degassed into the weld pool created by the high-energy-density beam, so that there are numerous expulsions of vapor, thereby creating porosity in the weld seam and a bond of mediocre quality.

The welding device of the invention makes it possible to weld coated sheets with a high-energy-density beam 11, such as for example a laser beam of the $CO_2$ or YAG type, while preventing any ejection of molten metal from the weld pool.

Figure 2:
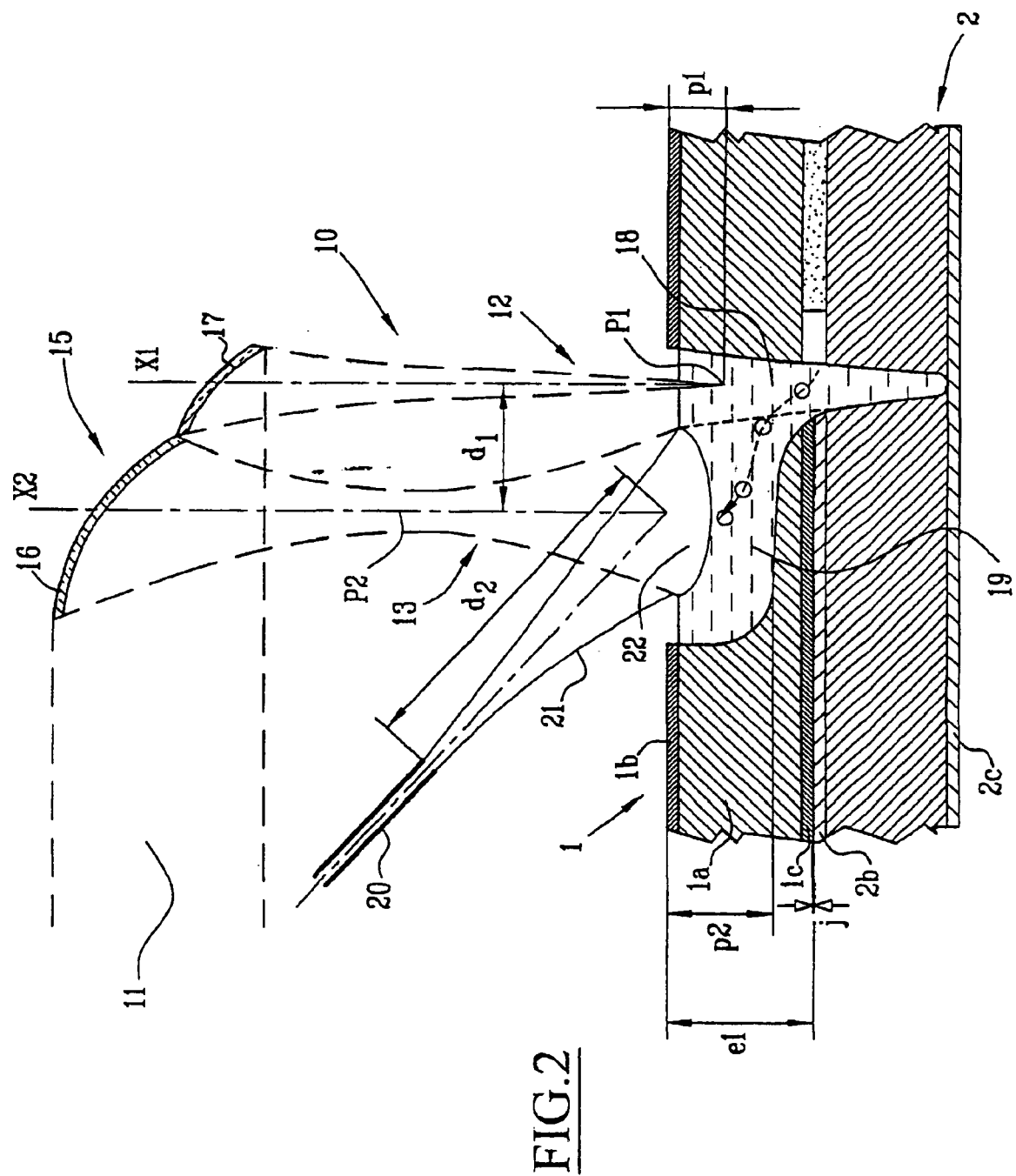
FIG. 2 is a schematic view in cross section of the welding device according to the invention.

To do this, and as shown in FIG. 2, the high-energy-density beam 11, which hereafter will be called the laser beam, is split into a fully penetrating first sub-beam 12 and a partially penetrating second beam 13, the two sub-beams 12 and 13 having a different power density at the upper level of the sheet 1.

The device 10 therefore comprises means for splitting the laser beam 11 that consist, for example, of a bifocal head 15 equipped with a focusing mirror having two dioptric elements, 16 and 17 respectively, of different focal lengths.

One of the dioptric elements, and especially the dioptric element 17, can move relative to the dioptric element 16 in order to position the optical axis X1 of the first sub-beam 12 relative to the optical axis X2 of the second sub-beam 13 on the upper face of the upper sheet 1.

The power of each sub-beam 12 and 13 is modulated according to the thickness of the two coated sheets 1 and 2 in the overlap region A and also according to the thickness of the upper coated sheet 1.

The focal point P1 of the first sub-beam 12 is, in the embodiment shown in FIG. 2, located within the upper coated sheet 1 at a depth p1 approximately equal to one third of the thickness e1 of said sheet 1.

According to an alternative embodiment, the focal point P1 of the first sub-beam 12 may also be located at a distance of more or less 2 mm from the upper face of the upper coated sheet 1.

Figure 3:
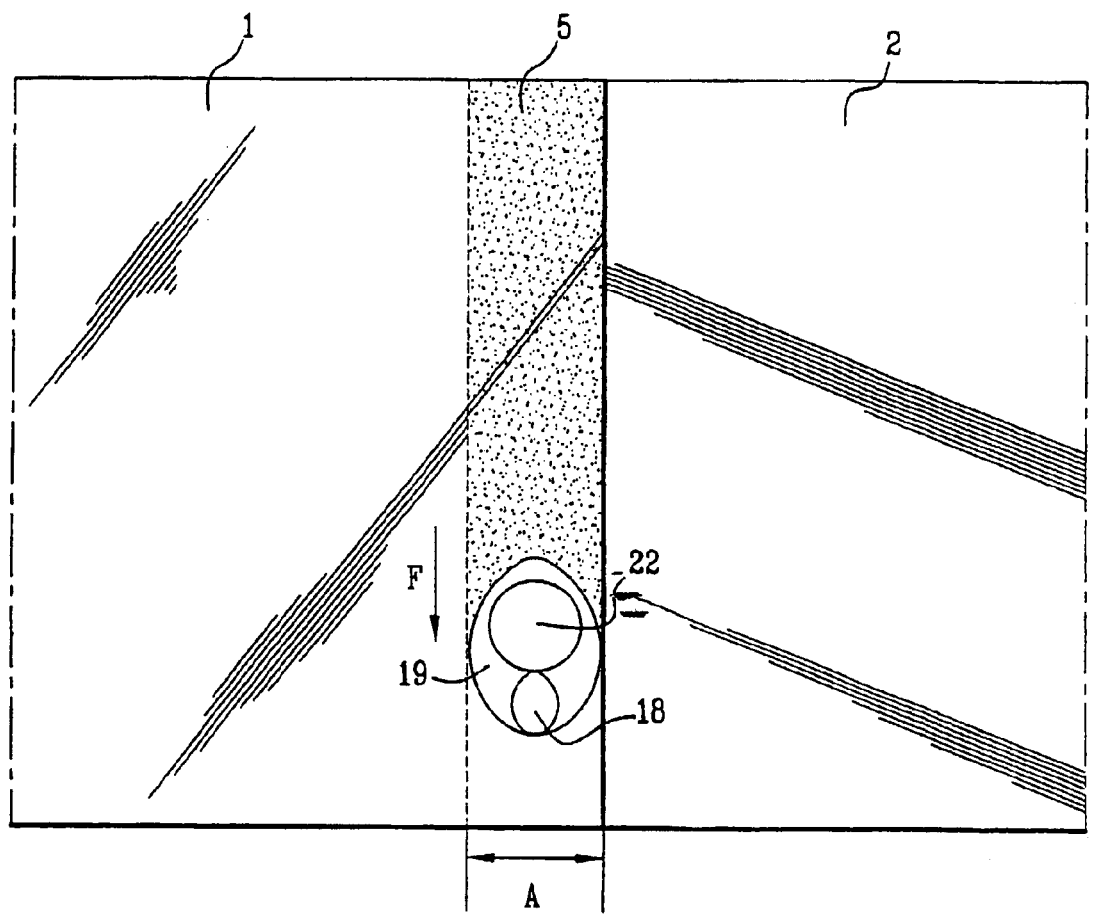
FIG. 3 is a schematic top view showing the weld pools formed on the surface of the coated metal sheets by the welding device according to the invention.

The first sub-beam 12 is intended to join the two coated sheets 1 and 2 by a hermetically sealed continuous weld bead or seam 5 (FIG. 3) and for this purpose this sub-beam 12 is a fully penetrating beam that forms, over the entire height of the coated sheets 1 and 2, a weld pool 18 having, in longitudinal section, the shape of a cone (FIG. 2) and, in cross section, an elliptical shape (FIG. 3).

The second sub-beam 13 is a partially penetrating beam and its focal point P2 is located above or below the upper face of the upper coated sheet 1. This second sub-beam 13 is designed to form a weld pool 19 having, in cross section, the shape of an unsymmetrical ellipse (FIG. 3), the depth p2 of said weld pool being less than the thickness e1 of the upper coated sheet 1 (FIG. 2).

As shown in FIG. 3, the surface area of the second weld pool 19 is greater than the surface area of the first weld pool 18 and this second weld pool 19 at least partly overlaps the first weld pool 18.

In the embodiment shown in the figures, the second weld pool 19 completely overlaps the first weld pool 18.

While the two coated sheets 1 and 2 are being welded, vapor of the coating material forms at the interface between these two sheets given that this material has an evaporation temperature below the melting point of the material of the central part 1a and 2a of said sheets, and this vapor rises to the surface of the weld pools 18 and 19.

Because of the increase in area of the weld pools by the second weld pool 19, the degassing area for the coating material vapor is thus increased, without increasing the quantity of this vaporized coating material.

The distance d1 between the optical axes X1 and X2 of the two sub-beams 12 and 13 is between 3 and 5 mm.

To increase the rate of removal of the coating material vapor through the weld pool 19, the device includes a nozzle 20 for blowing the second weld pool 19 with a strong jet 21 of inert gas such as, for example, argon, helium, nitrogen or a mixture of these gases.

This inert gas jet 21 has a high ejection velocity and forms a depression 22 in the surface of this second weld pool 19, the surface area of this depression being less than the surface area of the second weld pool 19 (FIG. 3).

As shown in FIG. 2, the point of contact of the axis X3 of the strong inert gas jet 21 on the upper face of the upper coated sheet 1 corresponds approximately to the point of impact of the optical axis X2 of the second sub-beam 13.

Moreover, the distance d2 separating the free end of the nozzle 20 from the point of contact of the axis X3 of the strong inert gas jet 21 on the upper face of the upper coated sheet 1 is between 30 and 50 mm.

The flow rate of inert gas through the nozzle 20 is between 12 and 35 l/min and this nozzle 20 makes an angle of between 30 and 60°.

The welding device 10 also includes means (not shown) for moving the means for splitting the laser beam 11, as well as the nozzle 20, along the overlap region A in the direction of the arrow F in order to produce the hermetically sealed weld seam 5, joining the two coated metal sheets 1 and 2 together.

According to a variant, the means for splitting the laser beam 11 and the nozzle 20 are stationary and the two coated metal sheets 1 and 2 move in the direction of the arrow F.

The welding speed is between 1 and 5 m/min.

The inert gas jet 21 allows the geometry of the second weld pool 19 to be varied, so as locally to decrease its thickness, thereby reducing the degassing depth, without disturbing the welding of the two coated sheets 1 and 2. This jet 21 also has the effect of exerting a backpressure on the weld pool.

Conventionally, an inert shielding or covering gas is blown into the welding zone.

The process and the device according to the invention allow better degassing of the weld pool and prevent expulsions of coating material vapor. Consequently, there is considerably less porosity in the weld seam, so that the fatigue resistance of the welded joint is improved.

The tolerance on positioning the two coated sheets is very substantial, and the process can be used on complex paths and requires no modifications in the design of the joined workpieces, and can therefore be used in operations upstream and downstream of the welding operation, and fits on any laser equipment without major modification of the unit.

Finally, the process and the device according to the invention are more tolerant with regard to chemical compositions containing larger amounts of elements of gamma-gene (such as those of high-strength steels) that require the weld pool to be cooled more slowly.

Throughout the above description, the terms "first pool" and "second pool" were used for the purpose of making the invention easier to understand. In fact, there is no physical separation between these weld pools—they form just a single pool.

What is claimed is:

1. A lap welding process for welding, by means of a high-energy-density beam (11), two metal sheets (1, 2) coated with a material that has an evaporation temperature below the melting point of the material of the sheets, characterized in that:
   the two coated sheets (1, 2) are at least partly overlapped;
   the faces of the two sheets (1, 2) in the overlap region are brought into contact with each other;
   the high-energy-density beam (11) is split, on the one hand, into a first sub-beam (12) fully penetrating both coated sheets (1, 2) in the overlap region and forming a first weld pool (18) in this region and, on the other hand, into a partially penetrating second sub-beam (13) forming a second weld pool (19), the depth of which is less than the thickness of the upper coated sheet (1), the second weld pool at least partly overlapping the first weld pool (18) in order to promote removal of the coating material vapor;
   an inert gas jet (21) is directed with a high ejection velocity onto the second weld pool (19) in order to form a depression (22) in the surface of the second weld pool (19), increasing the rate of removal of the coating material vapor; and
   a hermetically sealed continuous weld bead or seam (5) is formed along the overlap region by displacement of both sub-beams (12, 13) and the inert gas jet (21), or of both coated sheets (1, 2).

2. The process as claimed in claim 1, characterized in that the focal point of the first sub-beam (12) is located at about 2 mm from the upper face of the upper coated sheet (1).

3. The process as claimed in claim 1, characterized in that the focal point of the first sub-beam (12) is located in the upper coated sheet (1) at a depth lying between the upper face of this coated sheet (1) and about one third of the thickness of said sheet (1).

4. The process as claimed in claim 1, characterized in that the focal point of the second sub-beam (13) is located above or below the upper face of the upper coated sheet (1).

5. The process as claimed inclaim 1, characterized in that the surface area of the second weld pool (19) is larger than the surface area of the first weld pool (18).

6. The process as claimed in claim 1, characterized in that the surface area of the depression (22) is less than the surface area of the second weld pool (19).

7. The process as claimed in claim 1, characterized in that the power density of each sub-beam (12, 13) is modulated according to the thickness of the two coated sheets (1, 2) in the overlap region and to the thickness of the upper coated sheet (1).

8. A lap welding device for welding, by means of a high-energy-density beam (11), two sheets (1, 2) coated with a material having an evaporation temperature below the melting point of the material of the sheets (1, 2), characterized in that it comprises:

means (15) for splitting the high-energy-density beam (11), on the one hand, into a first sub-beam (12) fully penetrating both coated sheets (1, 2) in the overlap region and forming a first weld pool (18) in this region and, on the other hand, into a partially penetrating second sub-beam (13) forming a second weld pool (19), the depth of which is less than the thickness of the upper coated sheet (1), the second weld pool at least partially overlapping the first weld pool (18) in order to promote removal of the coating material vapor;

a nozzle (20) for blowing an inert gas jet (21) with a high ejection velocity onto the second weld pool (19) in order to form a depression (22) in the surface of the second weld pool (19), increasing the rate of removal of the coating material vapor; and means for the continuous displacement of both sub-beams (12, 13) and the nozzle (20), or of both coated sheets (1, 2).

9. The device as claimed in claim 8, characterized in that the means (15) for splitting the high-energy-density beam (11) comprise a focusing mirror having two dioptric elements (16, 17) of different focal lengths, one of said dioptric elements (16, 17) being able to be moved in order to adjust the position of the optical axes of the two sub-beams (12, 13) relative to each other.

10. The device as claimed in claim 8, characterized in that the distance separating the optical axes of the two sub-beams (12, 13) is between 3 and 5 mm.

11. The device as claimed in claim 8, characterized in that the point of contact of the axis of the inert gas jet (21) on the upper face of the upper coated sheet (1) corresponds approximately to the point of impact of the optical axis of the second sub-beam (13) on the said upper face.

12. The device as claimed in claim 8, characterized in that the high-energy-density beam is a laser beam.

13. The device as claimed in claim 8, characterized in that the distance separating the free end of the nozzle (20) from the point of contact of the axis of the inert gas jet (21) on the upper face of the upper coated sheet (1) is between 30 and 50 mm.

14. The device as claimed in claim 8, characterized in that the inert gas flow rate is between 12 and 35 l/min.

15. The device as claimed in claim 8, characterized in that the nozzle (20) makes an angle of between 30 and 60° with the upper face of the upper coated sheet (1).

* * * * *